(12) United States Patent
Graham et al.

(10) Patent No.: US 6,594,700 B1
(45) Date of Patent: Jul. 15, 2003

(54) SYSTEM AND METHOD FOR IMPLEMENTING A UNIVERSAL SERVICE BROKER INTERCHANGE MECHANISM

(75) Inventors: Stephen G. Graham, Chapel Hill, NC (US); Brent A. Miller, Cary, NC (US); Steven M. Miller, Apex, NC (US); Brian Lee White Eagle, Austin, TX (US); James C. Colson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/333,137

(22) Filed: Jun. 14, 1999

(51) Int. Cl.[7] .............................................. G06F 15/16
(52) U.S. Cl. ...................... 709/230; 709/219; 709/220; 709/221; 709/222; 709/223
(58) Field of Search ................................. 709/219, 230, 709/246, 217, 220, 221, 222, 223, 224, 225, 226

(56) References Cited

U.S. PATENT DOCUMENTS

| | | | | |
|---|---|---|---|---|
| 5,524,253 A | * | 6/1996 | Pham et al. ................. | 395/800 |
| 5,778,189 A | * | 7/1998 | Kimura et al. ............... | 709/236 |
| 5,983,265 A | * | 11/1999 | Martino, II .................. | 709/206 |
| 6,108,345 A | * | 8/2000 | Zhang ......................... | 370/401 |
| 6,185,611 B1 | * | 2/2001 | Waldo et al. ................ | 709/221 |
| 6,216,158 B1 | * | 4/2001 | Luo et al. .................... | 709/217 |
| 6,298,377 B1 | * | 10/2001 | Hartikainen et al. ........ | 709/223 |
| 6,314,459 B1 | * | 11/2001 | Freeman ...................... | 709/220 |
| 6,415,329 B1 | * | 7/2002 | Gelman et al. .............. | 709/245 |
| 2001/0002473 A1 | * | 5/2001 | Waldo et al. ................ | 709/229 |

* cited by examiner

Primary Examiner—Dung C. Dinh
Assistant Examiner—Isaac Woo
(74) Attorney, Agent, or Firm—Gregory M. Doudnikoff; Carstens, Yee & Cahoon, LLP

(57) ABSTRACT

A service provider protocol adapter servlet listens for service advertising requests. Each protocol is associated with a different servlet that understands the details of the service advertising mechanism unique to that protocol. The service provider protocol adapter servlet then converts the service advertisement from a service protocol into a canonical representation of service advertising and stores the advertisement in an internal registry. A client protocol adapter servlet listens for client lookup requests and looks up a corresponding service provider in the internal registry. As with service provider protocol adapter servlets, a different client protocol adapter servlet handles the details of client lookup for each particular protocol. The client protocol adapter servlet then converts a client request into a canonical representation of the request, which is then used to look up the service required by the client. Once a match has been found, the client protocol adapter servlet brokers the mechanism of client-service provider interaction.

36 Claims, 7 Drawing Sheets

SYSTEM AND METHOD FOR IMPLEMENTING A UNIVERSAL SERVICE BROKER INTERCHANGE MECHANISM

BACKGROUND OF THE INVENTION

1. Technical Field

The present invention relates to providing services for clients in need of the requested services. More particularly the present invention relates to providing services for clients using one protocol and service providers using another protocol.

2. Description of Related Art

The emergence of information appliances and new types of connectivity is spurring a new form of networking—unmanaged, dynamic networks of consumer devices that spontaneously and unpredictably join and leave the network. Consumers will expect these ad hoc, peer-to-peer networks to automatically form within the home, in very small businesses, and in networked vehicles.

In order for this technology to be accepted by the consumer, it must be very easy to use. A key aspect of making these networks easy to use is making them self-configuring, rendering them virtually transparent to the consumer. Service discovery protocols help make networks self-configuring.

A service discovery protocol (of which there are many) eliminates the need to hardwire or pre-configure the components of a network. There are typically three kinds of components involved in networks enhanced by service discovery protocols: clients, service providers, and registries. A client is usually a user interface; although, it can be any software program that requires services from other components of the network. Service providers are network connected devices, or software modules running on the network that provide useful services to other network-connected components. Useful services include, for example, faxing a document, storing a file, and connecting to the Internet. Registries are software components that act like a dynamic directory or "Yellow Pages" for the network. Service providers advertise their capabilities in the registries, and clients look up required services in the registries. The role of the service discovery protocol is to facilitate service advertising and client lookup, and broker the service to the client.

Service discovery protocols currently present in the industry include: Jini™ from Sun Microsystems Inc., 901 San Antonio Road, Palo Alto, Calif. 94303; the Simple Service Discovery Protocol of Universal Plug and Play™ from Microsoft Corporation, One Microsoft Way, Redmond, Wash. 98052; Service Location Protocol (IETF draft standard); InfernoSpaces™ from Lucent Techonlogies, Inc., 600 Mountain Avenue, Murray Hill, N.J. 07974; and Salutation™ from the Salutation Consortium. There are also several others available.

Sun has constructed a bridge between Jini and SLP. This bridge allows service providers using SLP to appear in a Jini lookup service registry. Sun did not provide a mechanism to allow SLP clients to access Jini services. Therefore, this bridge or gateway provides only one-way interchange between the two protocols and is limited in scope to only the two protocols.

Other proposals have suggested bridges between specific protocols, but these bridges are usually one-way interchanges. Another problem with these proposals, thus far, is that the scope of the proposal is usually limited to a protocol shepherded by the party proposing the bridge, thereby limiting the scope to only one or two protocols outside the party's protocol.

Given that none of the service discovery protocols are expected to dominate, it is believed that networks may contain service providers and clients using any number of service discovery protocols. It would be advantageous to provide a system and method for facilitating the different protocols to work in harmony between client and server providers. It would also be advantageous to provide a system and method to enhance the usability of services having their own unique protocols and to maximize the number of clients that can utilize them.

SUMMARY OF THE INVENTION

In an effort to overcome the above mentioned shortcomings, the present invention is based on the belief that multiple service discovery protocols will continue to exist in the foreseeable future. The present invention offers solutions to allow interoperability of devices and services that implement different service discovery protocols.

The present invention utilizes an enhanced registry mechanism that can broker requests and responses among many different protocols. The enhanced registry mechanism of the present invention, called the Universal Service Broker Interchange Mechanism (USBIM), provides several important enhancements to the standard registry service.

The USBIM is a coordinated set of components that collaborate to provide interoperability among service discovery protocols. Initially, service provider protocol adapter servlets listen for service advertising requests. Each protocol is associated with a different servlet that understands the details of the service advertising mechanism peculiar to that protocol. The service provider protocol adapter servlets then convert the service provider's protocol into a canonical representation of service advertising. The advertisement is stored in an internal registry. Client protocol adapter servlets listen for client lookup requests and look up a matching service provider. As with service provider protocol adapter servlets, a different client protocol adapter servlet handles the details of client lookup for each particular protocol. The client protocol adapter servlets then convert the client request into a canonical representation of the request, which is used to look up the services required by the client and to match these requirements against the service provider advertisements stored in the same canonical form in the internal registry. Once a match has been found, the client protocol adapter servlet brokers the mechanism of client-service provider interaction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
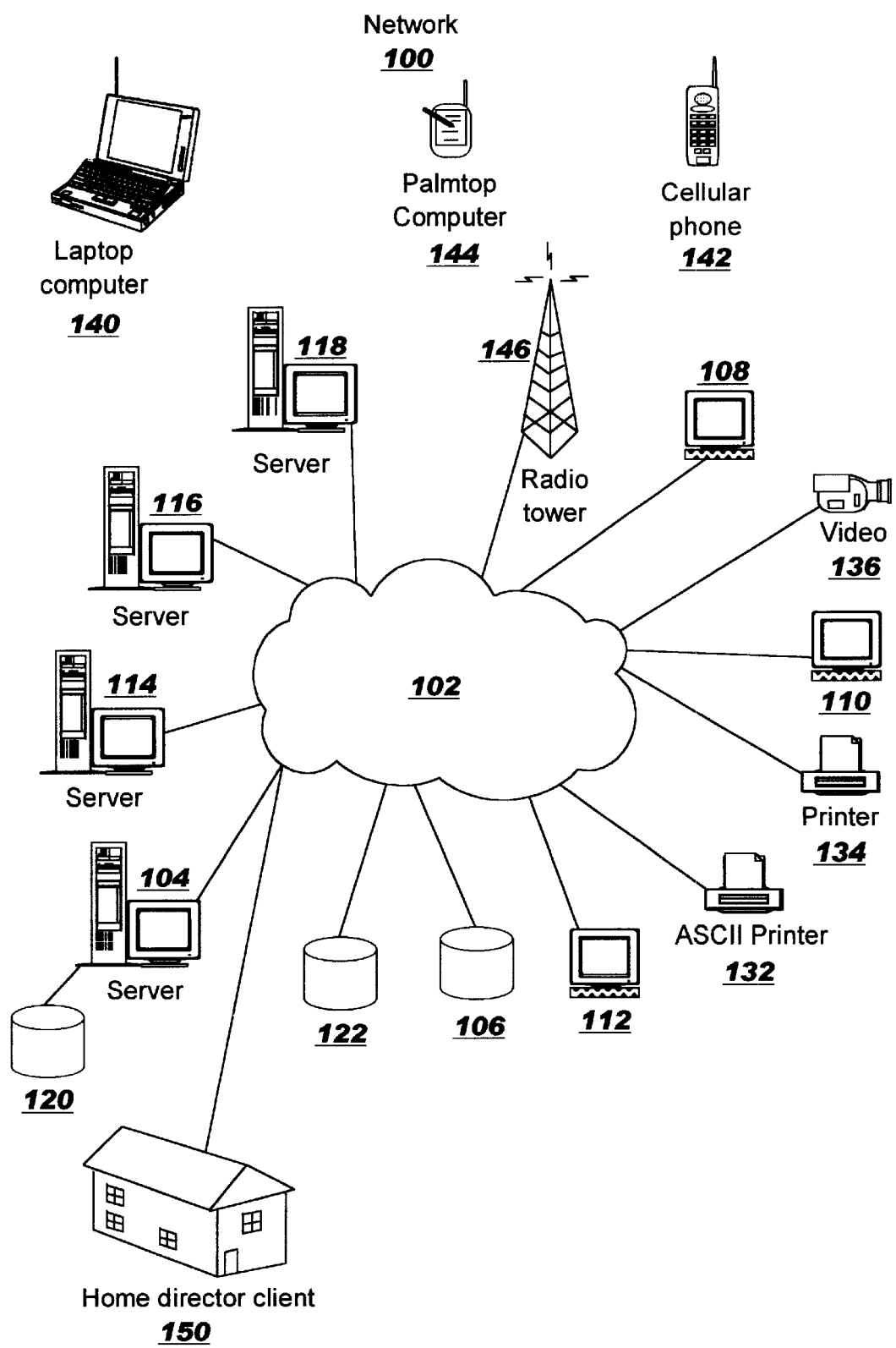
FIG. 1 is a pictorial representation of a distributed data processing system in which the present invention may be implemented.

With reference now to the figures, and in particular with reference to FIG. 1, a pictorial representation of a distributed data processing system in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. The network may also include wireless connections using InfraRed connections or RF technologies.

In the depicted example, servers 104, 114, 116 and 118 are connected to network 102. Storage units 106 and 122 are also connected to network 102, providing backup support for any or all of servers 104, 114, 116 and 118. Storage unit 120 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the administrator, in which case requests directed to the failed server are routed to the redundant backup server.

Servers 104, 114, 116 and 118 may have the ability to perform specific services needed by clients 108, 110 and 112, or may control the access to services stored within the servers or on one of databases 106, 120 and 122. Service provides may also include devices necessary for completing the requested service, such as printer 132 and 134, or video camera 136. These service providers may be contacted directly by the requesting client or may be controlled by one of servers 104, 114, 116 and 118, thus intercepting and processing the service request before passing it to the service provider.

Clients may be in the form of traditional client computers, such as clients 108, 110 and 112, or may be one of a plurality of appliance types of client, such as video camera 136, cellular phone 142, palmtop computer 144, laptop computer 140, or even home director client 150, which requires services from service providers for performing home monitoring and control functions.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, or a local area network. Radio tower 146 depicts a wireless connection means and gateway for connecting wireless devices such as cellular phone 142, palmtop computer 144, and laptop computer 140. It should be noted that many of the devices could be connected to the service provider by wired means and/or wireless means, such as home director client 150. It should also be note that certain devices, especially appliances, might be both a requesting client desiring services from a service provider and a service provider for providing a service to a requesting client. For example, home director 150 may be connected to remote appliances within the house through the power lines within the home. Each appliance may request services from the home director server, which provides those services to the clients. Alternatively, the home director server may be connected to a remote network server via either a hard-wired or wireless means. The home director server may then request services from the remote network server.

FIG. 1 is intended as an example and not as an architectural limitation for the processes of the present invention.

Figure 2:
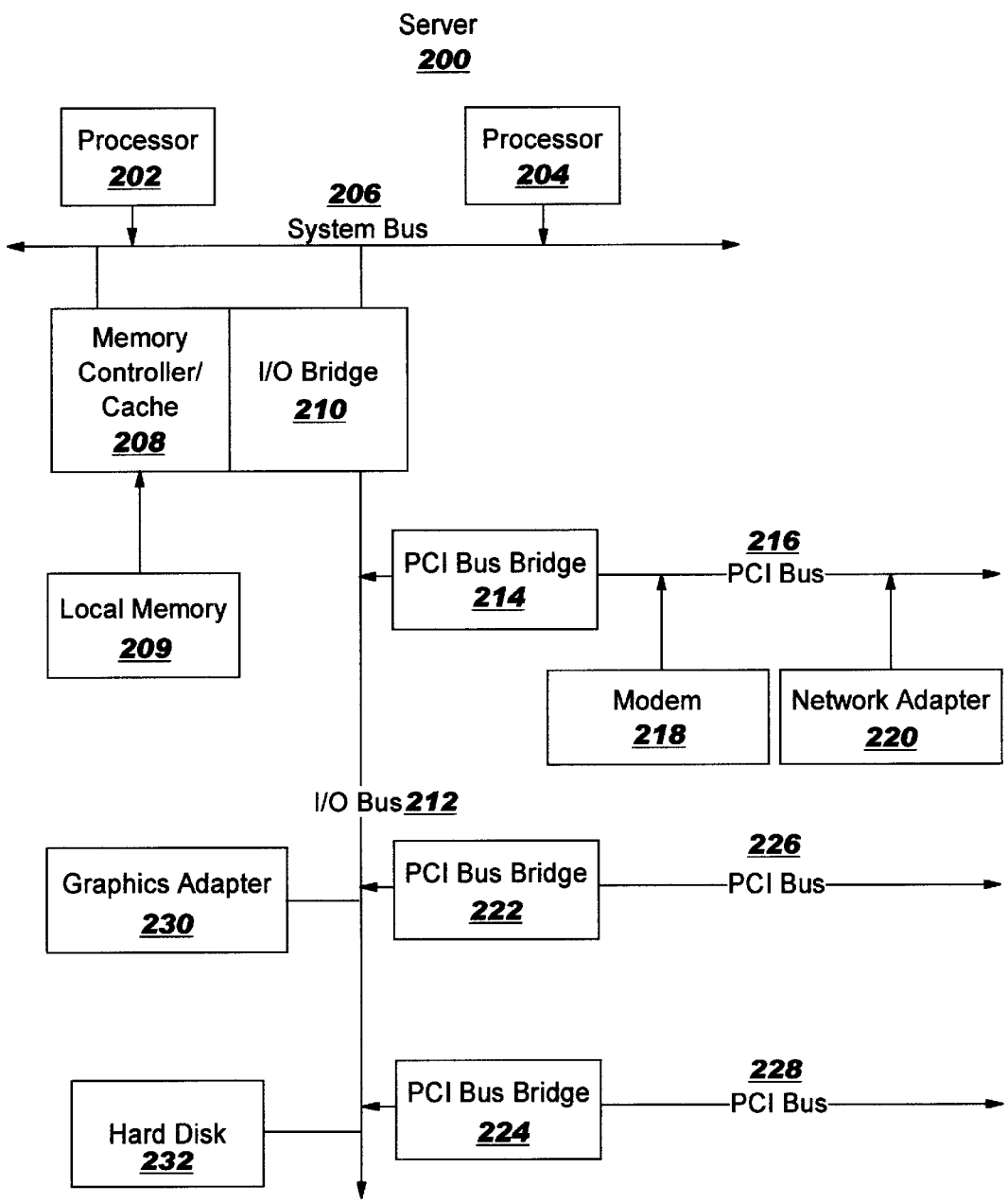
FIG. 2 is a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
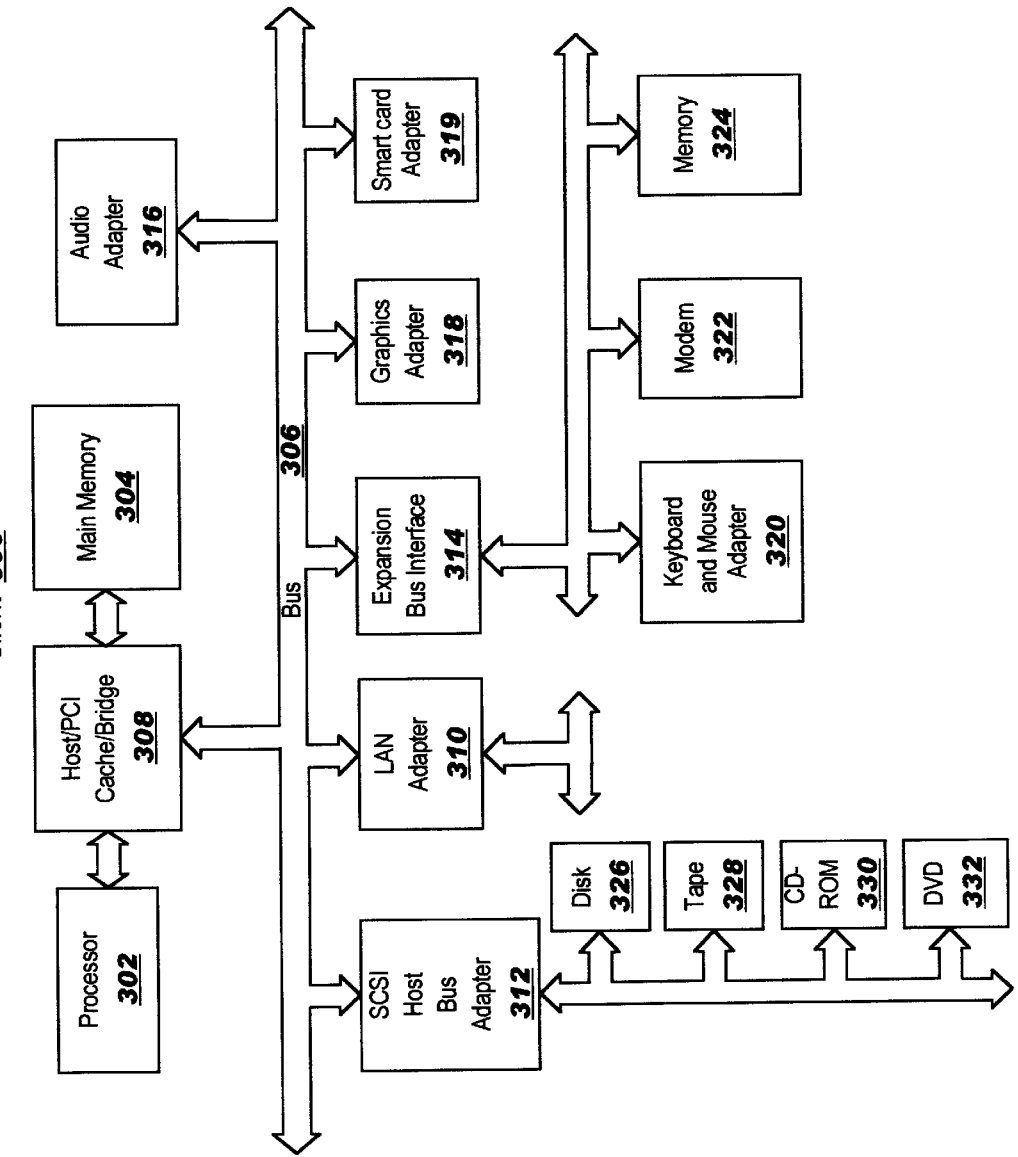
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java™, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems or may be configured as a netPC having as processor and very little onboard memory relying instead on a server for services and memory capability. Moreover, the processes of the present invention may be applied by devices which, while possessing some computing power, could not be defined as computers but as function-specific appliances.

Figure 4:
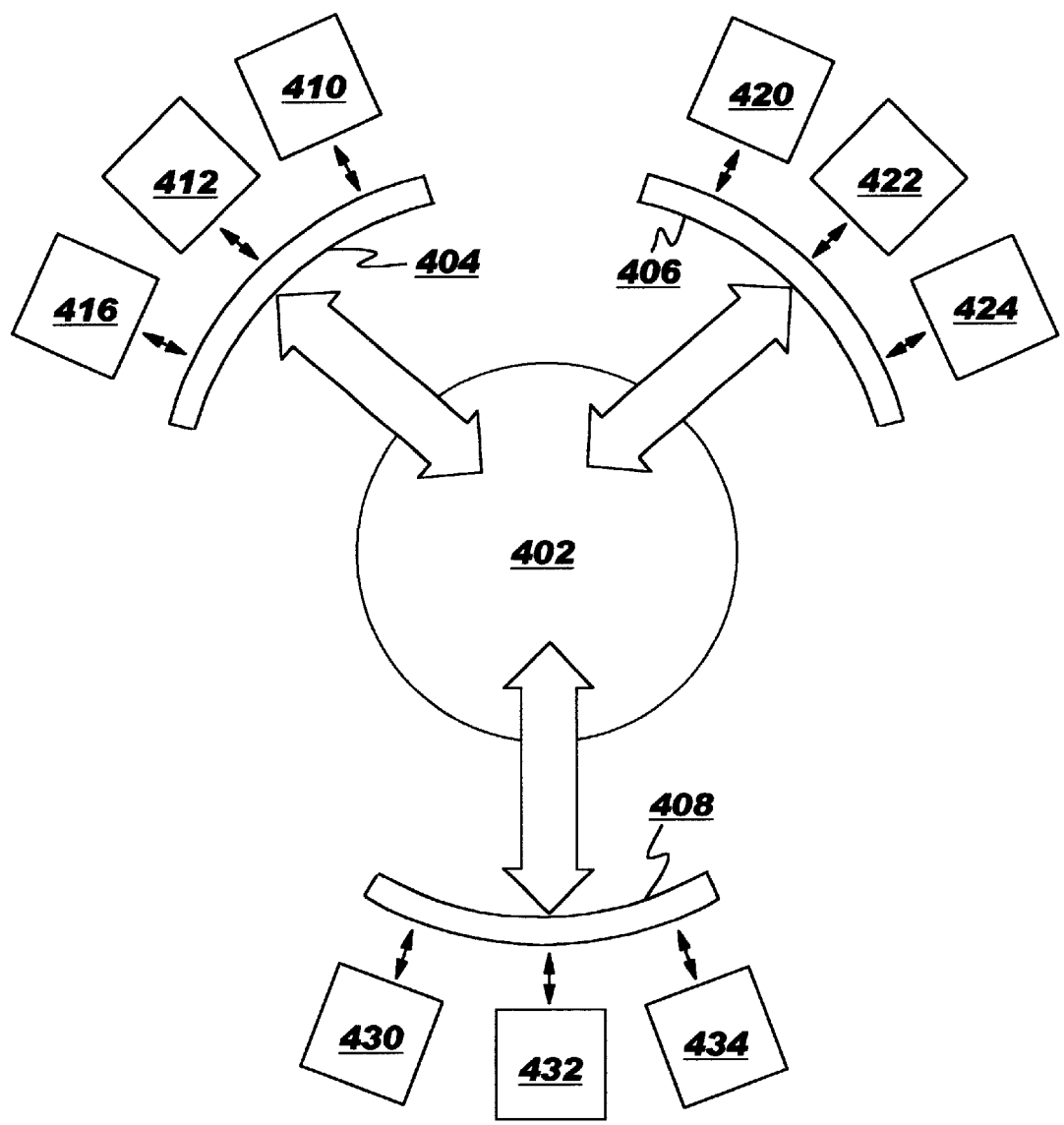
FIG. 4 is a conceptual diagram depicting the interaction between the functional elements needed for brokering an interface between a service provider and a client needing service.

FIG. 4 is a conceptual diagram of a universal service broker interchange mechanism (USBIM), depicting interaction between the functional elements needed for brokering an interface between a service provider and a client needing service. In diagram 400, clients 410, 412 and 416 represent clients requiring a service. As discussed above, if a service provider is available for the needed service, such as one of service providers 420, 422 and 424, and the protocol is compatible with the requester client, a service discovery protocol may be used for establishing collaboration between the client and the service provider.

In accordance with a preferred embodiment of the present invention, the protocols of the requester client and the service provider are unimportant. In the present invention, a client may have a protocol which is the same as or different from that of the service provider because an interaction between the client and the service provider is brokered in a protocol-independent internal registry 402.

In accordance with the present invention, internal registry 402 is an internal registry providing rapid in-memory access to a database of service registrations. The preferred embodiment of these service registrations utilizes Extensible Markup Language (XML) documents. The registry provides a convenient and efficient pattern matching mechanism for client lookup. In a preferred embodiment, internal registry 402 is implemented as an in-memory database providing the required characteristics.

In the present invention, service providers 420, 422 and 424 advertise services in the same manner as those of prior art; however, rather than the requesting client receiving the advertisement directly from the service provider, internal registry adapter servlets intercept the advertisement. Specifically, service provider protocol adapter servlets 406, which are componentized mechanisms based on servlets, listen for service advertising requests. Each protocol is associated with a different servlet that understands the details of the service advertising mechanism unique to that protocol. The unique protocol of the service provider is converted to a canonical representation of the service provider advertisement.

The converted representation is stored in internal registry 402. Each time a new service provider advertises a new service or updated service, service provider protocol adapter servlets 406 convert the service provider's unique protocol into a canonical representation and update internal registry 402 with the new service information. At any one time, internal registry 402 contains an index of canonical representations of service advertisements from service providers 420, 422 and 424.

In a preferred embodiment of the present invention, the canonical representation is an XML-based representation of service advertising and lookup based upon an XML document type definition (DTD). The definition of a document type in XML consists of a set of mark-up tags and their interpretations. The canonical representation is an important aspect of the present invention for providing interoperability among protocols. The role of the service advertising servlet is to convert the incoming protocol-specific data into the canonical form for service advertising in the registry. It is also responsible for protocol-specific details, such as service advertisement lifetimes or durations, service access restrictions, etc., for example Jini leasing. Similarly, the client lookup servlets are responsible for converting incoming protocol-specific queries into canonical queries in the registry.

Clients 410, 412 and 416 may request a service using their own unique client protocol. However, as the advertisements for the services are stored in a canonical representation within internal registry 402, protocol adapter servlets are required for conversion of the client protocol to the canonical representation. Client protocol adapter servlets 404, which function similarly to the service provider protocol adapter servlets 406, are componentized mechanisms based on servlets, that listen for client lookup requests. As with service provider protocol adapter servlets, a different client protocol adapter servlet handles the details of client lookup for each protocol. Client protocol adapter servlets convert the client request in the requesting client's protocol to a canonical representation of the request.

In addition, client protocol adapter servlets 404 also search internal registry 402 for the requested service advertisement in the index of service provider advertisements, and respond back to the requesting client with the results of the search using the client's request protocol. Associated with the client lookup mechanism is the ability to broker the mechanism of client-service provider interaction.

For example, consider a printer service advertised using the UPnP protocol, specifying it supports the LPR: protocol. If a matching Jini-based client lookup request is received, it is the responsibility of the client servlet to generate a marshalledObject (analogous to a network device driver) that has an implementation of the appropriate Java interface corresponding to LPR:. This area has the greatest potential for incompatibility within the interchange mechanism. For example, Jini service providers implementing arbitrary Java interfaces are not available to, for example, UPnP clients, unless there is a description of the Service:Name: protocol associated with the Jini service.

In effect, the client protocol adapter servlet brokers an interchange mechanism between the requester client and the service provider. In the case of brokering a UpnP-based service to a Jini client, this is accomplished by providing a Java interface and implementation based on the Service-:Name: protocol associated with the service provider to the requesting client.

Persistence adapter servlets 408 are componentized mechanisms, also based on servlets, that interact with persistence mechanisms 430, 432 and 434. One type of persistence adapter servlet allows static services, such as legacy devices that do not participate in any service discovery protocol, to appear as pre-configured entries in the registry. Thus, services provided by static service providers, such as legacy devices which would have gone undetected using the service discovery protocol, are indexed in the internal registry along with service providers which advertise their services. The services of these legacy devices are then available to the requesting clients using the universal service broker interchange mechanism. In an example, one persistence component allows a lightweight directory access protocol (LDAP), a protocol for accessing on-line directory services. Other persistence mechanisms include: other directory mechanisms, such as Novell's Netware; flat files (i.e., serialized Java objects and/or XML documents); relational databases; object databases, etc.

The persistence mechanism differs from the service providers in that the persistence mechanism is strictly startup and shutdown oriented. Because of this orientation, the contents of the internal registry can be retrieved from the persistence mechanism each time the universal service broker interchange mechanism is restarted or stored to the persistence mechanism at shutdown.

The above description is merely exemplary and may be modified in a number of aspects for differing needs. For instance, the canonical representation might be based on Standard Generalized Markup Language (SGML) rather than XML, as SGML is the international standard (ISO 8879) for defining descriptions of the structure and content of different types of electronic document.

Figure 5:
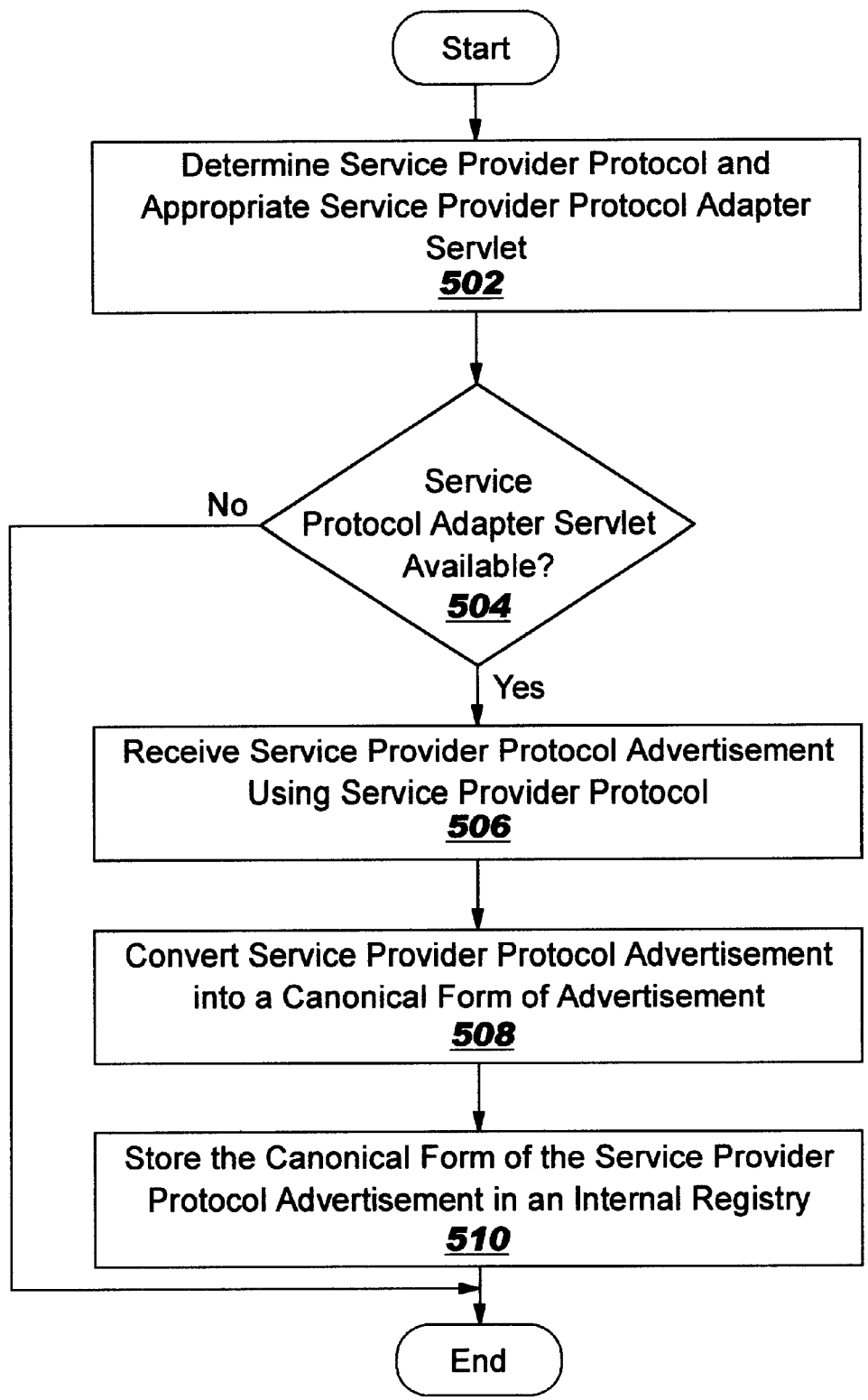
FIG. 5 is a flowchart illustrating the function of service provider protocol adapter servlets.

FIG. 5 is a flowchart illustrating the function of service provider protocol adapter servlets 406. The process begins by determining the service provider's unique protocol and using the appropriate service provider protocol adapter servlet for the advertisement in the unique protocol of the service provider (step 502). Next, a check is made to determine whether a service provider protocol adapter servlet is available for the protocol (step 504).

Because the present invention is considered to be a dynamic service broker exchange mechanism, it is expected that as new service providers are introduced to the market, the service providers will also provide servlets for the new protocols. However, as the protocol adapter servlet is fundamental to the present invention, if a servlet does not exist for the specific service protocol, the process ends.

If, after matching the servlet to the protocol, the service protocol adapter (servlet is available, the service provider protocol adapter servlet receives the service provider protocol advertisement (step 506). The servlet for the specific protocol then converts the service protocol advertisement into a canonical form of the advertisement (step 508). The canonical representation of the service provider advertisement is then stored in internal registry (step 510). The process then ends.

Figure 6:
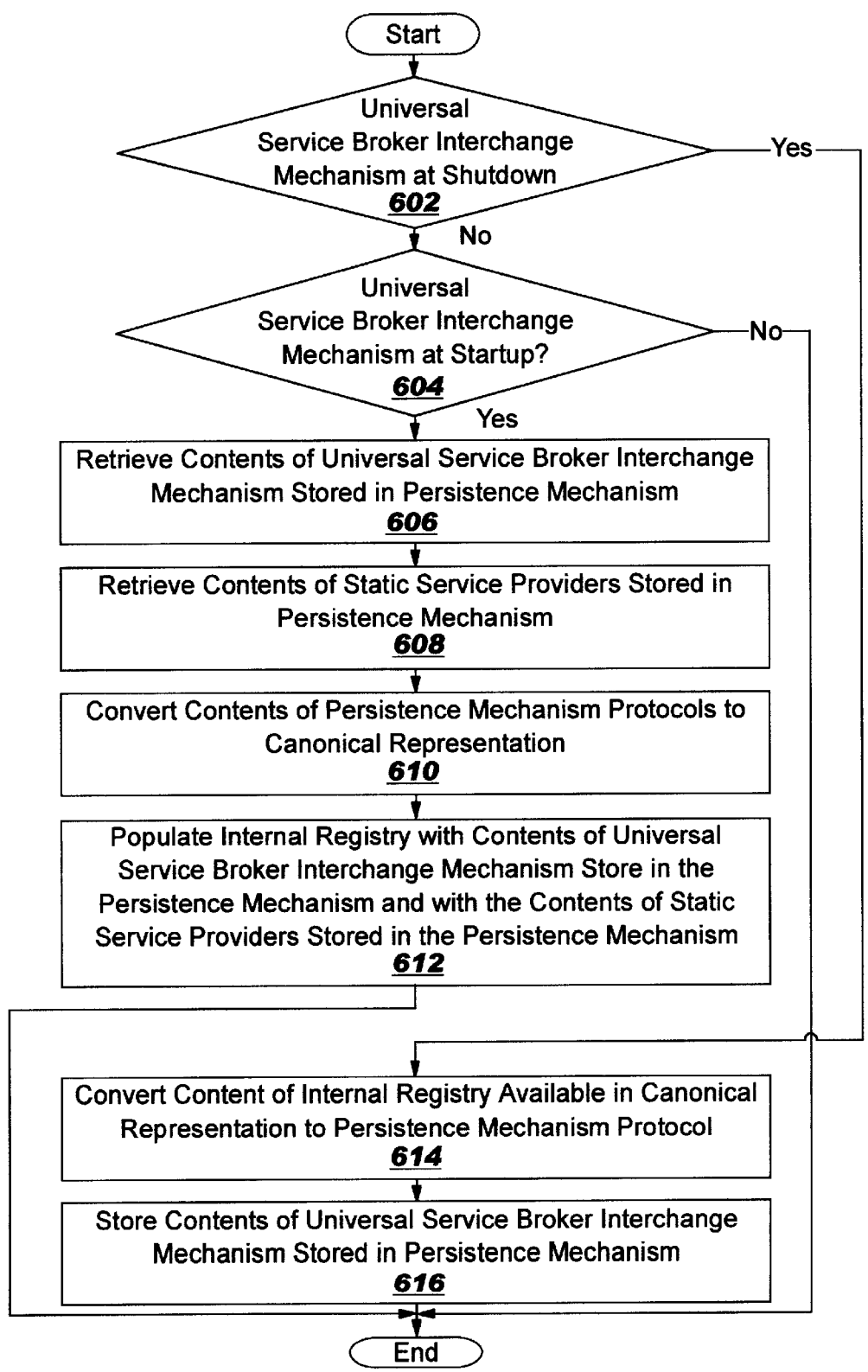
FIG. 6 is a flowchart illustrating the function of persistence adapter servlets.

FIG. 6 is a flowchart illustrating the function of persistence adapter servlets 408. A function of persistence adapter servlets is to ferry internal registry contents among the canonical representations, the internal registry, and the protocol of the persistence mechanism. This process could proceed from storing to or retrieving from the persistence mechanism. Because the USBIM is strictly startup and shutdown oriented, the process starts by determining the state of the universal service broker interchange mechanism.

First, a determination is made whether the USBIM is at shutdown (step 602). If it is determined that the USBIM is shutting down, the process flows to step 614, where the contents of the internal registry, which is in a canonical representation, is converted to the protocol supported by the persistence mechanism for storing the registry. The converted contents of the internal registry is then stored in the persistence mechanism for the internal registry (step 616). The process then ends, or more accurately, the contents of the internal registry remains in the persistence mechanism until the USBIM restarts.

Returning to decision 602, if it is determined that the USBIM is not at the shutdown state, a check is made to determine if the USBIM is at the startup state. If not, the process ends, because the USBIM is either shut down or running. Alternatively, the persistence adapter servlets might wait to be notified by the USBIM of an impending state change rather than constantly checking for one.

Returning to decision 604, if the USBIM is starting up, the contents of the universal service broker interchange mechanism are retrieved from the persistence mechanism (step 606). Next, the contents of the persistence mechanism for static service providers is retrieved (step 608). Importantly, persistence adapter servlets used to retrieve static service contents from a persistence mechanism must either configure the contents of the persistence mechanism for entry in the registry or the contents of the persistence mechanism must be pre-configured for entry into the registry. Therefore, specific persistence adapter servlets may be assigned for this task. Regardless, the contents of all persistence mechanisms are converted from the protocol of the individual persistence mechanism to the canonical representation (step 610). The internal registry is then pre-populated with both the contents of the internal registry stored in a persistence mechanism and information about the static service providers retrieved from a persistence mechanism (step 612). The process then ends.

Figure 7:
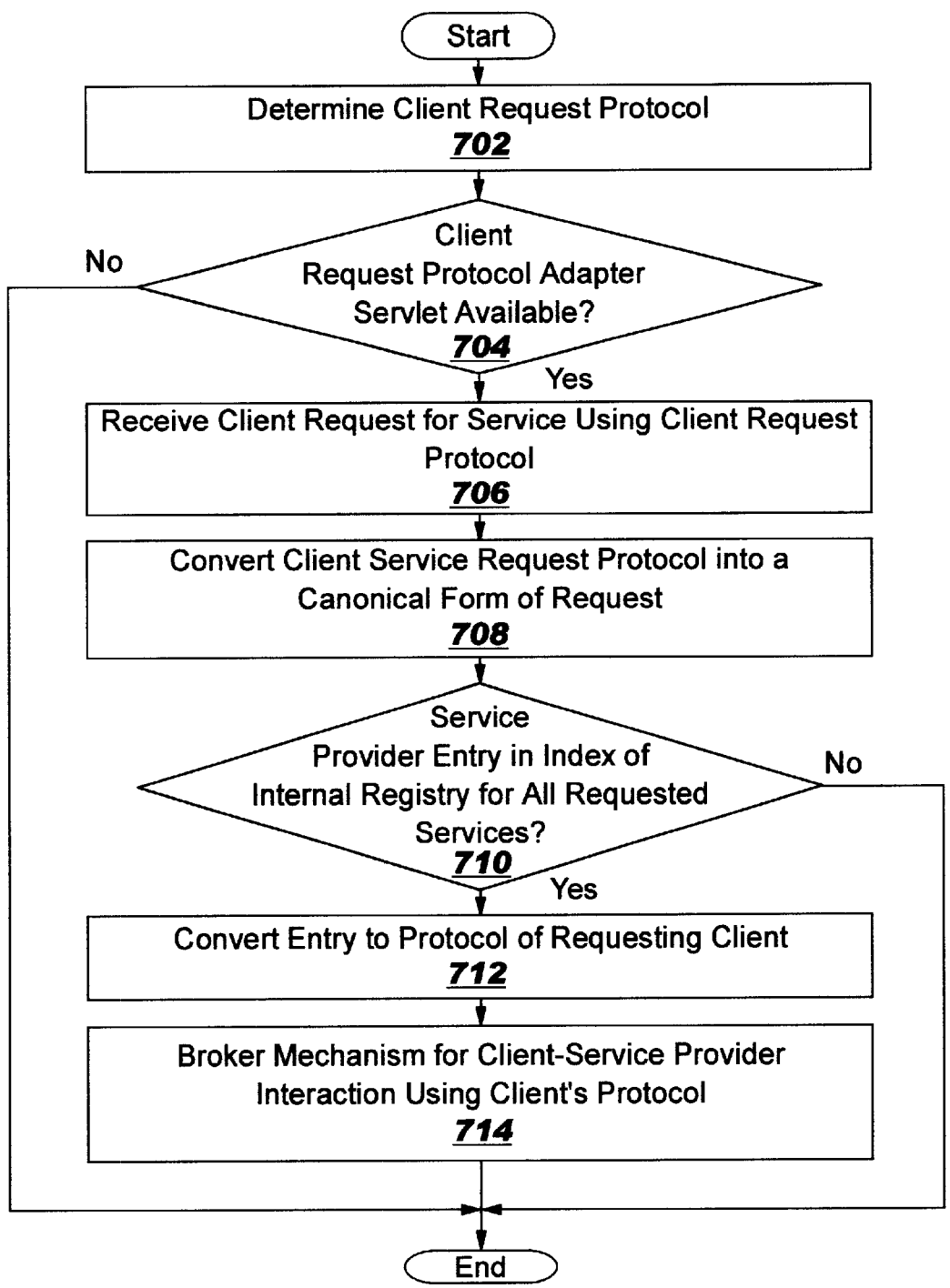
FIG. 7 is a flowchart illustrating the process for a client requesting a service using client protocol adapter servlets.

FIG. 7 is a flowchart illustrating the process for a client requesting a service using client protocol adapter servlets. The process begins by determining the client service request protocol (step 702). Then, a determination is made as to whether an adapter servlet is available for the unique protocol of the client service request (step 704). If no servlet is available for the specific protocol, the process ends.

If, on the other hand, a servlet is available, the client protocol adapter servlet receives the request for service from a client, using the client's own unique protocol (step 706). The servlet then converts the client service request protocol to the canonical representation (step 708). Using the canonical representation of the client requested service, the internal registry may be searched for an advertisement for the requested service from a service provider. A check is made to determine whether the requested service is available in the index of the internal registry (step 710). In a preferred embodiment of the present invention, the entry may be an advertisement from a service discovery protocol service provider or pre-configured information from a static service provider.

The internal registry may or may not have entries for all of the services requested by the client. If the requested services are not in the internal registry, the process ends. If the requested services are available in the internal registry, the client protocol adapter servlet converts the entry from the canonical representation to the protocol supported by the requesting client (step 712). Finally, the client protocol adapter servlet brokers a mechanism for interaction between the client and service provider using the client's protocol (step 714). The process then ends.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy discs, hard disk drives, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for transmitting and receiving protocol specific data comprising:

receiving data, wherein the data conforms to a first protocol;

transforming the data from the first protocol to an intermediate protocol;

converting the data from the intermediate protocol to a second protocol;

transmitting data conforming to the second protocol;

indexing the data; and storing the data, which is in the intermediate protocol, on a storage medium, wherein the first protocol is different from the second protocol.

2. The method recited in claim 1, wherein the step of transforming further comprises:

receiving a request for data, wherein the requested data conforms to a second protocol;

transforming the requested data from the second protocol to the intermediate protocol; and looking up data in the index corresponding to the requested data.

3. The method recited in claim 1, wherein the intermediate protocol and the second protocol do not reside on a client making a request for data.

4. The method recited in claim 1, wherein the first protocol resides on a first data processing system, and the second protocol resides on a second data processing system, the method further comprising:

receiving data from the first data processing system, wherein the data conforms to the second protocol;

converting the data from the intermediate protocol to the first protocol; and transferring data conforming to the second protocol to the second data processing system.

5. A data processing system implemented method for implementing a universal service broker interchange for brokering service advertisements in a service provider protocol to a requester client using a requester client protocol, the method comprising:

receiving a service advertisement in a service provider protocol;

transforming the service advertisement from the service provider protocol to an intermediate protocol;

storing the service advertisement in a registry using the intermediate protocol;

receiving a service request in a requester client protocol;

transforming the service request from the requester protocol to the intermediate protocol;

looking up service advertisements corresponding to the service request using the intermediate protocol;

converting the service advertisement from the intermediate protocol to the requester client protocol; and transferring the service advertisement in the requester client protocol.

6. The method recited in claim 5, wherein the method further comprises providing an interchange mechanism between the requester client and the service provider prior to performing the step of transferring.

7. The method recited in claim 5, wherein the universal services broker interchange method is bi-directional, such that the method further comprises:

receiving a service advertisement in a requester client protocol;

transforming the service advertisement from the requested client protocol to an intermediate protocol;

storing the service advertisement in the registry using the intermediate protocol;

receiving a service request in the service provider protocol;

transforming the service request from the service provider protocol to the intermediate protocol;

looking up service advertisements corresponding to the service request using the intermediate protocol;

converting the service advertisement from the intermediate protocol to the service provider protocol; and transferring the service advertisement in the service provider protocol.

8. The method recited in claim 5, wherein the step of storing comprises indexing the service advertisement in a registry, wherein the registry is populated with at least one advertised service and at least one service which is not advertised.

9. The method recited in claim 5, wherein prior to the step of receiving, the method comprises:

receiving data from a persistence mechanism in a persistence mechanism protocol;

converting data from a persistence mechanism protocol to the intermediate protocol; and pre-populating the registry with data from the persistence mechanism using the intermediate protocol.

10. The method recited in claim 5, wherein subsequent to the step of transferring, the method comprises:

converting data in the registry from the intermediate protocol to the persistence mechanism protocol;

transferring the data from the registry to the persistence mechanism using the persistence mechanism protocol; and storing the data in the persistence mechanism.

11. A data processing system implemented method for implementing a universal services broker interchange for brokering service advertisements in a service provider protocol to a requester client using a requester client protocol, the method comprising:

receiving a request for service, wherein the request is formatted in a requester client's protocol;

looking up a requested service in an index, wherein at least one service description from a service provider is stored in the index, and wherein the at least one service description is formatted using an intermediate protocol;

converting a service description to the requester client's protocol; and providing an interaction mechanism between the requester client and the service provider.

12. The method recited in claim 11, wherein the service description is pre-populated in the index at the time the index is started up.

13. The method recited in claim 11, wherein the service description is populated in the index by receiving a service advertisement including the service description.

14. A data processing system implemented method for implementing a universal services broker interchange for brokering service advertisements in a service provider protocol to a requester client using a requester client protocol, the method comprising:

receiving a service advertisement from a service provider;

converting data corresponding to the service advertisement from a first data format to a canonical representation of the data in an intermediate format; and storing the canonical representation of the data in the intermediate format in a services registry on a network, wherein the services registry includes a look up mechanism for looking-up canonical representations of data in the intermediate format in response to receipt of a service request in a second format different from the first format and the intermediate format.

15. A data processing system for transmitting and receiving protocol specific data comprising;

receiving means for receiving data, wherein the data conforms to a first protocol;

transforming means for transforming the data from the first protocol to an intermediate protocol;

converting means for converting the data from the intermediate protocol to a second protocol;

transmitting means for transmitting data conforming to the second protocol;

indexing means for indexing the data; and storing means for storing the data, which is in the intermediate protocol, on a storage medium, wherein the first protocol is different from the second protocol.

16. The system recited in claim 15, wherein the transforming means for transforming further comprises:

receiving means for receiving a request for data, wherein the requested data conforms to a second protocol;

transforming means for transforming the requested data from the second protocol to the intermediate protocol; and looking up means for looking up data in the index corresponding to the requested data.

17. The system recited in claim 15, wherein the intermediate protocol and the second protocol do not reside on a client making a request for data.

18. The system recited in claim 15, wherein the first protocol resides on a first data processing system, and the second protocol resides on a second data processing system, the system further comprising:

receiving means for receiving data from the first data processing system, wherein the data conforms to the second protocol;

converting means for converting the data from the intermediate protocol to the first protocol; and transferring means for transferring data conforming to the second protocol to the second data processing system.

19. A data processing system for implementing a universal service broker interchange for brokering service advertisements in a service provider protocol to a requester client using a requester client protocol, the system comprising:

receiving means for receiving a service advertisement in a service provider protocol;

transforming means for transforming the service advertisement from the service provider protocol to an intermediate protocol;

storing means for storing the service advertisement in a registry using the intermediate protocol;

receiving means for receiving a service request in a requester client protocol;

transforming means for transforming the service request from the requester protocol to the intermediate protocol;

looking up means for looking up service advertisements corresponding to the service request using the intermediate protocol;

converting means for converting the service advertisement from the intermediate protocol to the requester client protocol; and transferring means for transferring the service advertisement in the requester client protocol.

20. The system recited in claim 19, wherein the system further comprises the providing means for providing an interchange mechanism between the requester client and the service provider.

21. The system recited in claim 19, wherein the universal services broker interchange system is bi-directional, such that the system further comprises:

receiving means for receiving a service advertisement in a requester client protocol;

transforming means for transforming the service advertisement from the requested client protocol to an intermediate protocol;

storing means for storing the service advertisement in the registry using the intermediate protocol;

receiving means for receiving a service request in the service provider protocol;

transforming means for transforming the service request from the service provider protocol to the intermediate protocol;

looking up means for looking up service advertisements corresponding to the service request using the intermediate protocol;

converting means for converting the service advertisement from the intermediate protocol to the service provider protocol; and transferring means for transferring the service advertisement in the service provider protocol.

22. The system recited in claim 19, wherein the storing means for storing comprises indexing the service advertisement in a registry, wherein the registry is populated with at least one advertised service and at least one service which is not advertised.

23. The system recited in claim 19 further comprises:

receiving means for receiving data from a persistence mechanism in a persistence mechanism protocol;

converting means for converting data from a persistence mechanism protocol to the intermediate protocol; and pre-populating means for pre-populating the registry with data from the persistence mechanism using the intermediate protocol.

24. The system recited in claim 19 further comprises:

converting means for converting data in the registry from the intermediate protocol to the persistence mechanism protocol;

transferring means for transferring the data from the registry to the persistence mechanism using the persistence mechanism protocol; and storing means for storing the data in the persistence mechanism.

25. A data processing system for implementing a universal services broker interchange for brokering service advertisements in a service provider protocol to a requester client using a requester client protocol, the system comprising:

receiving means for receiving a request for service, wherein the request is formatted in a requester client's protocol;

looking up means for looking up a requested service in an index, wherein at least one service description from a service provider is stored in the index, and wherein the at least one service description is formatted using an intermediate protocol;

converting means for converting a service description to the requester client's protocol; and providing means for providing an interaction mechanism between the requester client and the service provider.

26. The system recited in claim 25, wherein the service description is pre-populated in the index at the time the index is started up.

27. The system recited in claim 25, wherein the service description is populated in the index by receiving a service advertisement including the service description.

28. A data processing system for implementing a universal services broker interchange for brokering service advertisements in a service provider protocol to a requester client using a requester client protocol, the system comprising:

an internal registry for storing information describing services offered by service providers in an intermediate protocol in an index;

a service provider protocol adapter servlet for converting information describing a service offered by a service provider from a service provider's protocol to an intermediate protocol of the internal registry and indexing the information in the internal registry; and client request protocol adapter servlet for converting a client request from a client's protocol to the intermediate protocol of the internal registry and looking up requested information in the internal registry.

29. The system recited in claim 28 further comprises:

a persistence mechanism protocol adapter servlet for converting information from a persistence mechanism's protocol to the intermediate protocol of the internal registry and indexing the information in the internal registry.

30. The system recited in claim 28, wherein the service provider protocol adapter servlet listens for service advertisements from a specific service provider.

31. The system recited in claim 28, wherein the client request protocol adapter servlet provides an interchange means between a service provider and a requesting client.

32. The system recited in claim 28 further comprises:

a persistence mechanism protocol adapter servlet for converting information from the intermediate protocol of the internal registry to the persistence mechanism's protocol and for storing information in the internal registry to a persistence mechanism.

33. A data processing system for implementing a universal services broker interchange for brokering service advertisements in a service provider protocol to a requester client using a requester client protocol comprising:

means for receiving a service advertisement from a service provider;

means for converting data corresponding to the service advertisement from a first data format to a canonical representation of the data in an intermediate format; and means for storing the canonical representation of the data in the intermediate format in a services registry on a network, wherein the services registry includes a look up mechanism for looking-up canonical representations of data in the intermediate format in response to receipt of a service request in a second format different from the first format and the intermediate format.

34. A computer program product implemented on a data processing system for performing a method for transmitting and receiving protocol-specific data, the product being imbedded on a computer readable medium and comprising a series of instructions, the instructions comprising:

receiving instructions for receiving data, wherein the data conforms to a first protocol;

transforming instructions for transforming the data from the first protocol to an intermediate protocol;

converting instructions for converting the data from the intermediate protocol to a second protocol;

transmitting instructions for transmitting data conforming to the second protocol;

indexing instructions for indexing the data; and storing instructions for storing the data, which is in the intermediated protocol, on a storage medium, wherein the first protocol is different for the second protocol.

35. A computer program product implemented on a data processing system for performing a method for transmitting and receiving protocol-specific data, the product being imbedded on a computer readable medium and comprising:

first instructions for receiving a service advertisement from a service provider;

second instructions for converting data corresponding to the service advertisement from a first data format to a canonical representation of the data in an intermediate format; and third instructions for storing the canonical representation of the data in the intermediate format in a services registry on a network, wherein the services registry includes a look up mechanism for looking-up canonical representations of data in the intermediate format in response to receipt of a service request in a second format different from the first format and the intermediate format.

36. A data processing system implemented method for transmitting and receiving protocol specific data comprising:

receiving data, wherein the data conforms to a first protocol format;

transforming the data from the first protocol format to an intermediate protocol format;

storing the data in the intermediate protocol format for later retrieval by a computing device;

retrieving the data in the intermediate protocol format in response to a request being received from the computing device;

converting the data from the intermediate protocol format to a second protocol format associated with the computing device; and transmitting data conforming to the second protocol format to the computing device.

* * * * *